(12) United States Patent
Howard et al.

(10) Patent No.: US 11,898,843 B2
(45) Date of Patent: Feb. 13, 2024

(54) OPTICAL LASER TARGET

(71) Applicant: Milwaukee Electric Tool Corporation, Brookfield, WI (US)

(72) Inventors: Samuel J. Howard, Hales Corners, WI (US); Michael Dan Huh, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 379 days.

(21) Appl. No.: 17/121,308

(22) Filed: Dec. 14, 2020

(65) Prior Publication Data

US 2021/0102808 A1 Apr. 8, 2021

Related U.S. Application Data

(63) Continuation of application No. PCT/US2020/027458, filed on Apr. 9, 2020.

(60) Provisional application No. 62/850,335, filed on May 20, 2019, provisional application No. 62/832,127, filed on Apr. 10, 2019.

(51) Int. Cl.
*G01C 15/00* (2006.01)
*G01C 15/02* (2006.01)

(52) U.S. Cl.
CPC .......... *G01C 15/006* (2013.01); *G01C 15/02* (2013.01)

(58) Field of Classification Search
CPC .................................................. G01C 15/006
See application file for complete search history.

(56) References Cited

U.S. PATENT DOCUMENTS

| 3,778,169 | A | 12/1973 | Adams |
| 5,708,748 | A * | 1/1998 | Ohtomo ............... G01C 15/02 |
| | | | 385/115 |
| 6,046,800 | A | 4/2000 | Ohtomo et al. |
| 6,798,548 | B2 | 9/2004 | Yamazaki et al. |
| 6,950,250 | B2 * | 9/2005 | Kousek ............... G01C 15/006 |
| | | | 359/857 |
| 7,130,035 | B2 | 10/2006 | Ohtomo et al. |
| 7,193,695 | B2 | 3/2007 | Sugiura |
| 7,222,431 | B1 | 5/2007 | Norton et al. |

(Continued)

FOREIGN PATENT DOCUMENTS

| KR | 10-2011-0017227 | 2/2011 |
| WO | WO 2004/099714 | 11/2004 |

OTHER PUBLICATIONS

U.S. Appl. No. 29/750,995, filed Sep. 17, 2020, Howard et al.

(Continued)

*Primary Examiner* — Michael A Berns
(74) *Attorney, Agent, or Firm* — Reinhart Boerner Van Deuren s.c.

(57) ABSTRACT

Various products that are used to align objects and features in an area are shown. In one example, a laser target provides optical communication between a target area of the laser target and a non-target area that is offset from the target area. Some light emitted towards the target area will be redirected to emit from the non-target area, and some light emitted towards the non-target area will be redirected to emit from the target area. In another example, a laser target includes reflective portions and non-reflective portions that facilitate aiming a laser target towards a center of the laser target.

6 Claims, 18 Drawing Sheets

(56) References Cited

U.S. PATENT DOCUMENTS

| | | | |
|---|---|---|---|
| 7,511,805 B2* | 3/2009 | Hinderling | G01C 15/02 |
| | | | 359/15 |
| 7,570,352 B2* | 8/2009 | Flannigan | G01B 5/0025 |
| | | | 356/153 |
| 7,880,865 B2* | 2/2011 | Tanaka | G02B 26/12 |
| | | | 356/5.15 |
| 7,992,312 B2* | 8/2011 | Krasko | G01B 5/0004 |
| | | | 33/529 |
| 8,720,074 B2 | 5/2014 | Amor | |
| 9,417,062 B2 | 8/2016 | Thierwechter | |
| 9,494,424 B2 | 11/2016 | Unger | |
| 9,921,060 B2 | 3/2018 | Winter | |
| 10,060,742 B2 | 8/2018 | Thierwechter | |
| D931,745 S* | 9/2021 | Wang | D10/70 |
| 11,167,866 B2* | 11/2021 | Bartlett | B64F 5/60 |
| 2002/0074484 A1 | 6/2002 | Kousek | |
| 2005/0254043 A1 | 11/2005 | Chiba | |
| 2015/0316374 A1 | 11/2015 | Winter | |
| 2021/0102808 A1* | 4/2021 | Howard | G01C 15/02 |

OTHER PUBLICATIONS

International Search Report and Written Opinion for International Application No. PCT/US2020/027458, dated Jul. 14, 2020, 12 pages.

Youtube, Johnson Self Leveling Combination 2 Line and 5 Dot Laser Level, https://www.youtube.com/watch?v=NEu89_sueEQ&feature=youtu.be&t=86 , posted on Jan. 29, 2013, 1 page.

* cited by examiner

OPTICAL LASER TARGET

CROSS-REFERENCE TO RELATED PATENT APPLICATIONS

The present application is a continuation of International Patent Application No. PCT/US2020/027458, filed Apr. 9, 2020, which claims the benefit of and priority to U.S. Provisional Application No. 62/850,335, filed May 20, 2019, and U.S. Provisional Application No. 62/832,127, filed Apr. 10, 2019, each of which are incorporated herein by reference in their entireties.

BACKGROUND OF THE INVENTION

The present disclosure relates generally to the field of tools. The present disclosure relates specifically to a laser target to be used in combination with a sighting laser.

Sighting lasers and laser targets are commonly used to measure distances and the placement of items. Sighting lasers emit focused light and the emitted light is aligned with a feature on the laser target. The sighting laser and/or the laser target are adjusted to reduce the displacement between the emitted light and the laser target.

SUMMARY OF THE INVENTION

In general, the disclosure described herein relates to a laser target that includes a body that comprises a target zone and an indicator zone. The laser target includes a mechanism to indicate that light has been projected to at least two locations within the target zone, such as at least two optical fibers having one end coupled within the target zone. The indicator zone comprises at least one signaling mechanism that emits a signal in response to light being detected within the target zone, such as the other ends of the at least two optical fibers to emit light that has been received by the ends within the target zone. In specific embodiments, the target zone comprises at least one aperture, the target zone includes a vertical slit with a means to detect light, and the target zone and the indication zone are distinct from each other.

In another embodiment, the laser target includes a body that defines a plurality of pairs of apertures, such as at least two pairs of apertures. For the first, second and third pairs of apertures, at least one aperture of each pair is aligned with a target line, and the other aperture of the each pair is offset from the target line. The aligned aperture and the offset aperture of each pair are optically connected (e.g., with a fiber optic cable) so that light received by one of the apertures is routed to and emitted by the other aperture. In general, the aligned apertures of each of the pairs define a target line, and the offset apertures define a pattern. When light from a light source (e.g., a laser line level) is positioned such that its emitted light coincides with the target line, the light is transmitted from each of the aligned apertures and out of each of the offset apertures via the optical connection. The emitted light from the offset apertures provides an indication that the light source is aligned with the target line.

In specific embodiments, the offset aperture of a first pair is offset from the target line further than the offset aperture of a second pair, and the offset aperture of the second pair is offset from the target line further than the offset aperture of a third pair. The aligned aperture of the second pair is between the aligned aperture of the first pair and the aligned aperture of the third pair. In one or more embodiments the target line is vertical (e.g., plumb with respect to level ground) or mostly vertical, such as within 5 degrees.

In one embodiment, the laser target includes twelve pairs of apertures, with one hole in each pair of apertures aligned with the target line and the other offset from the target line. The unaligned apertures define an X-shape in the front surface of the laser target body.

In another embodiment, a laser target includes a body with a front-surface that defines a plurality of apertures. The plurality of apertures include a first subset of apertures that are collinear with a target line and a second subset of apertures that are offset from the target line. The first subset of apertures are optically connected with at least one of the apertures in the second subset so that light received by one of the first subset of apertures is routed to and emitted by at least one of the second subset of apertures. The second subset of apertures are optically connected with at least one of the apertures in the first subset so that light received by one of the second subset of apertures is routed and emitted by at least one of the first subset of apertures. In at least one embodiment the second subset of apertures are aligned with one of two lines defining an X-shape in the front surface.

In another embodiment, a laser target comprises reflective portions and non-reflective portions. The reflective portions are arranged on the laser target such that as an emitted laser approaches a target line on the laser target, light reflections from the laser target are reflected to a user so as to indicate the proximity of the emitted laser to the target line.

In a specific embodiment the reflective portions comprise one or more angled portions that generally extend from the periphery of the laser target towards a center of the laser target. For example, the reflective portions comprise one or more angled lines, each line in a quadrant of the laser target. The reflective portions comprise a reflective material such as is used on reflective safety vests.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a laser target and elements thereof are shown. Various embodiments of the laser target discussed herein include an innovative visual response mechanism to indicate the locations of an emitted laser.

As will generally be understood, a laser target is used to align objects or features in an area (e.g., such as holes along a wall, pipe, conduit, etc.). When the laser is directed to a conventional laser target that is sufficiently far away, the user may be unable to directly see where the laser is projecting light on the conventional laser target. The user can address this by moving towards the laser target until the target is seen more clearly, but this can be time consuming and inefficient, particularly for long range sighting applications.

In various embodiments discussed herein, the laser target described herein is configured to provide improved visibility when the light from a laser level coincides with the target portion of the laser target (e.g., a vertical laser target line). In specific embodiments, the target includes several apertures that are aligned with a target line, such as a vertical target line of apertures in the center of the target's front surface. The target also includes several apertures that are offset from the target line. Each of the apertures aligned with the target line is in optical communication with at least one aperture offset from the target line, and vice versa. When a laser emits a light at the target and the emitted laser is aligned with the target line, the apertures offset from the target line emit light. As a result, the emitted light from the offset apertures provide an indication that the laser is aligned with the target line, and thus, the user can easily see an indication that the emitted laser is aimed at the target line. When a laser emits light at the target and the projected vertical line is offset from the target line but aligned with one of the offset apertures, the light is routed to and out of apertures along the target line. As a result, the user can more easily see an indication that the emitted laser vertical line is offset from the target line than if the laser target had a standard surface that does not enhance the visibility of the incident laser light.

Figure 1:
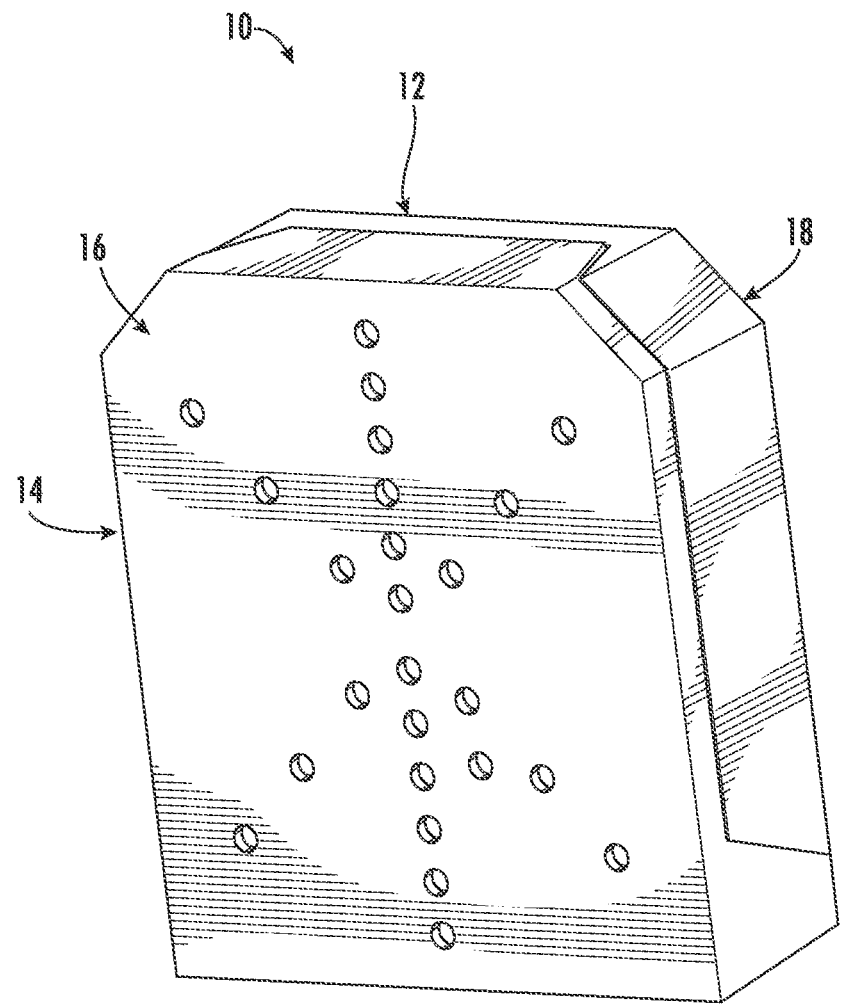
FIG. 1 is a perspective view of a laser target, according to an exemplary embodiment.

Referring to FIG. 1, a laser target, shown as target 10, includes a housing, shown as body 12. Body 12 includes a first shell 14 and a second shell 18 that define the periphery of body 12, including front surface 16.

Figure 2:
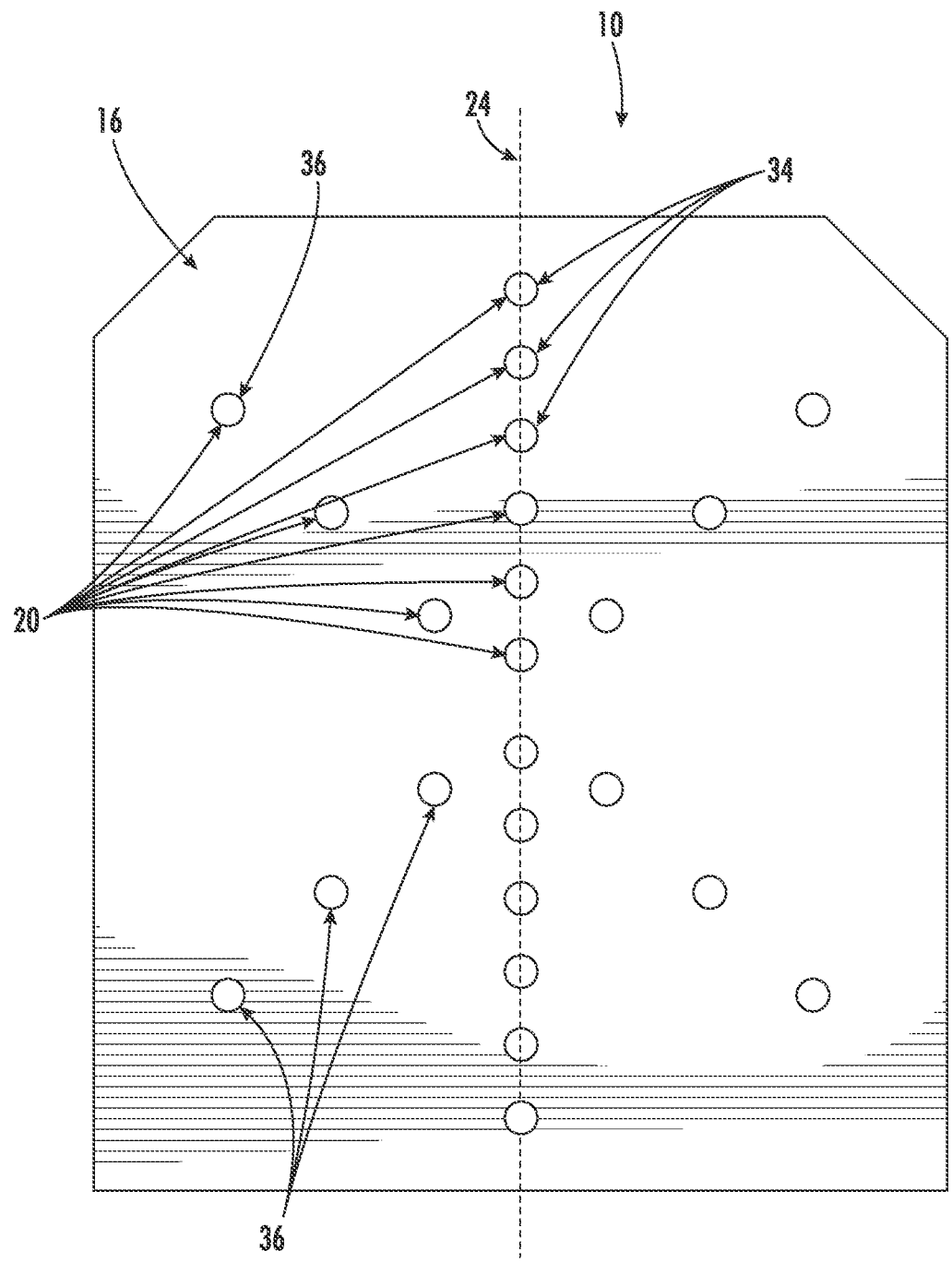
FIG. 2 is a front view of a laser target, according to an exemplary embodiment.
Figure 3:
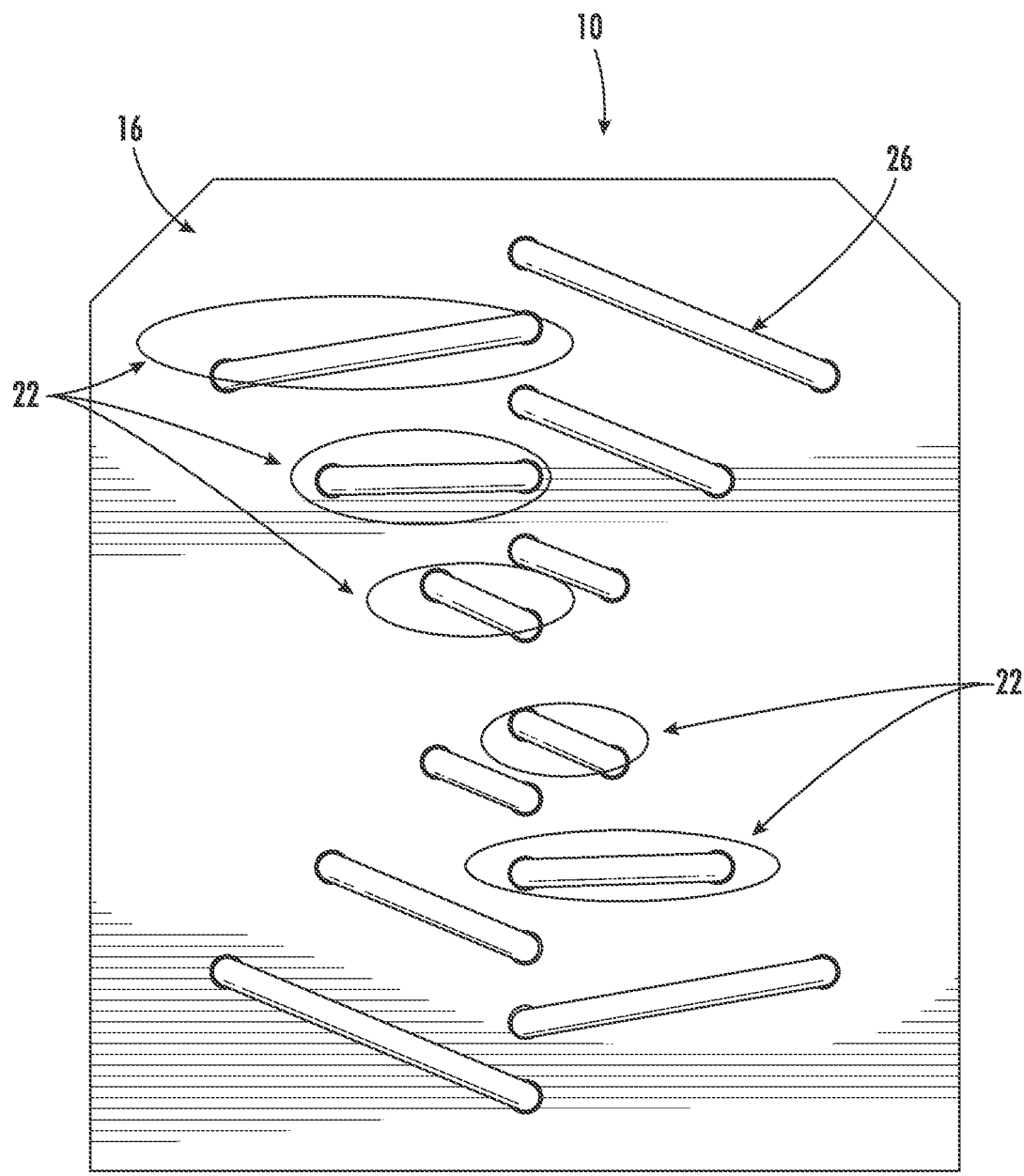
FIG. 3 is a schematic front view of a laser target, according to an exemplary embodiment.
Figure 4:
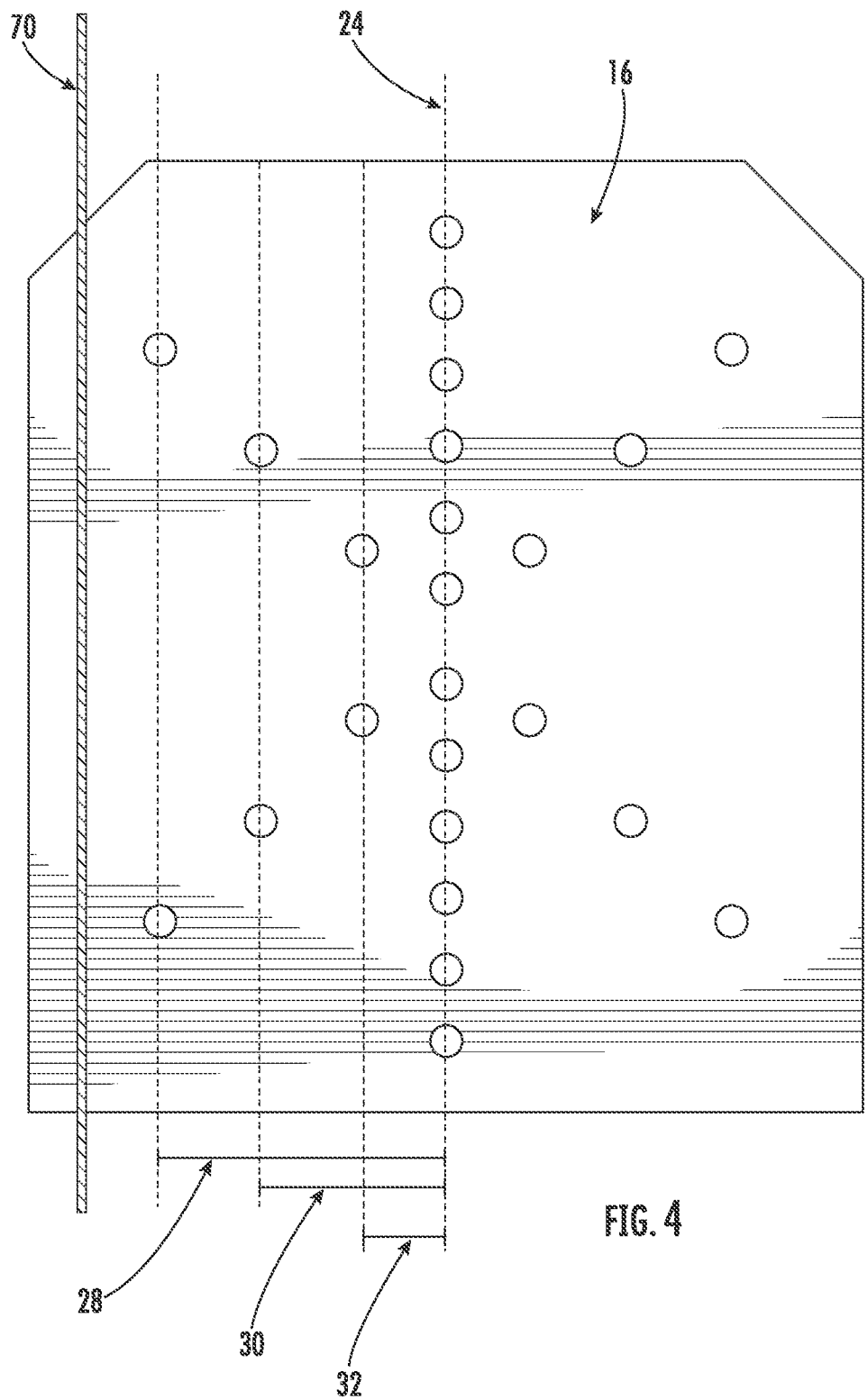
FIG. 4 is a front view of a laser target with an emitted laser projecting at a first position, according to an exemplary embodiment.

Referring to FIGS. 2-4, front surface 16 of body 12 defines a plurality of through-holes, shown as apertures 20, that interact with an emitted laser to help a user align the laser and the target 10, such as by providing enhanced visibility to the user for one or more indications of where the emitted laser is aimed. Apertures 20 include a first subset of apertures, shown as target apertures 34, and a second subset of apertures that are distinct from the first subset of apertures, shown as offset apertures 36. Target apertures 34 are aligned with target line 24, shown in FIG. 2 as a vertical line proximate the center of apertures 20. However, in other embodiments, target line 24 may be arranged in other orientations (e.g., horizontal, 45 degree angle, 60 degree angle, etc.) as may be used in various construction applications. Offset apertures 36 are offset from target line 24.

As shown in FIG. 3, apertures 20 include several pairs 22 of apertures that are in optical communication with each other, such as by an optical-signal carrying medium, shown as optical fiber 26. A given pair includes one aligned aperture 34 and one offset aperture 36. For paired apertures 20, as will be described below, as a result of light being received by one of the pair 22 of apertures 20, the light will be routed to and emitted by the other aperture 20 of the pair 22. For example, light received by an aperture 20 of the first subset of apertures 20 (e.g., a target aperture 34 of a pair 22 of apertures 20), is emitted by an aperture 20 of the second subset of apertures 20 (e.g., an offset aperture 36 of the respective pair 22). In a specific embodiment optical fiber 26 routes light between apertures 20 within a pair 22 of apertures 20 such that light received on a first aperture 20 of the pair 22 is routed to and emitted by the second aperture 20 of the pair 22.

As shown in FIG. 4, offset apertures 36 are offset from target line 24 one of distances 28, 30 and 32. It is to be understood that the offset apertures 36 on the right side of FIG. 4 are similarly offset from target line 24 one of distances 28, 30 and 32.

Figure 5:
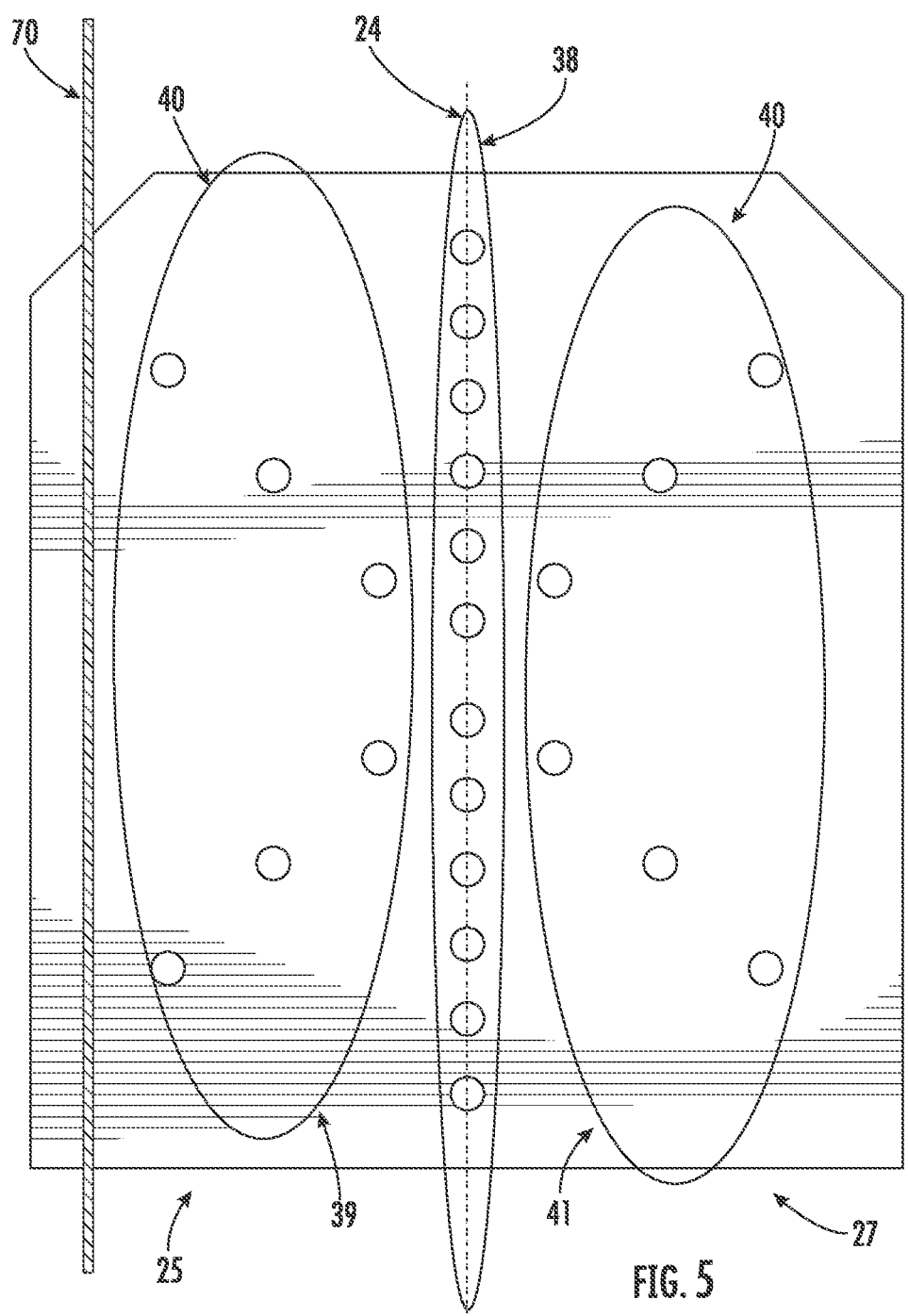
FIG. 5 is a front view of a laser target with an emitted laser projecting at a first position, according to an exemplary embodiment.

Turning to FIG. 5, grouped another way apertures 20 include first subset of apertures 20 aligned with target line 24, shown as target zone 38, and second subset of apertures 20, shown as indicator zone 40. In a specific embodiment indicator zone 40 is distinct from target zone 38, and indicator zone 40 includes a first indicator zone 39 on a first side 25 of target line 24, and a second indicator zone 41 on a second side 27 of target line 24 opposite first side 25. Target zone 38 and indicator zone 40 are defined by body 12. Indicator zone 40 includes apertures 20 on both sides of target line 24 that are offset from target line 24.

FIGS. 5-12 depict a series of images showing an emitted laser, shown as emitted laser 70, being aimed closer and closer to target line 24 until emitted laser 70 is aligned or nearly aligned with target line 24. Starting at FIG. 5, emitted laser 70 is not aligned with any of apertures 20. To correct this, a user adjusts emitted laser 70 to aim further to the right. For purposes of this description it will be stated that the aim of emitted laser 70 is adjusted by a user, although it is to be understood that target 10 instead may be moved, or both the sighting laser and target 10 may be adjusted for any given adjustment.

Figure 6:
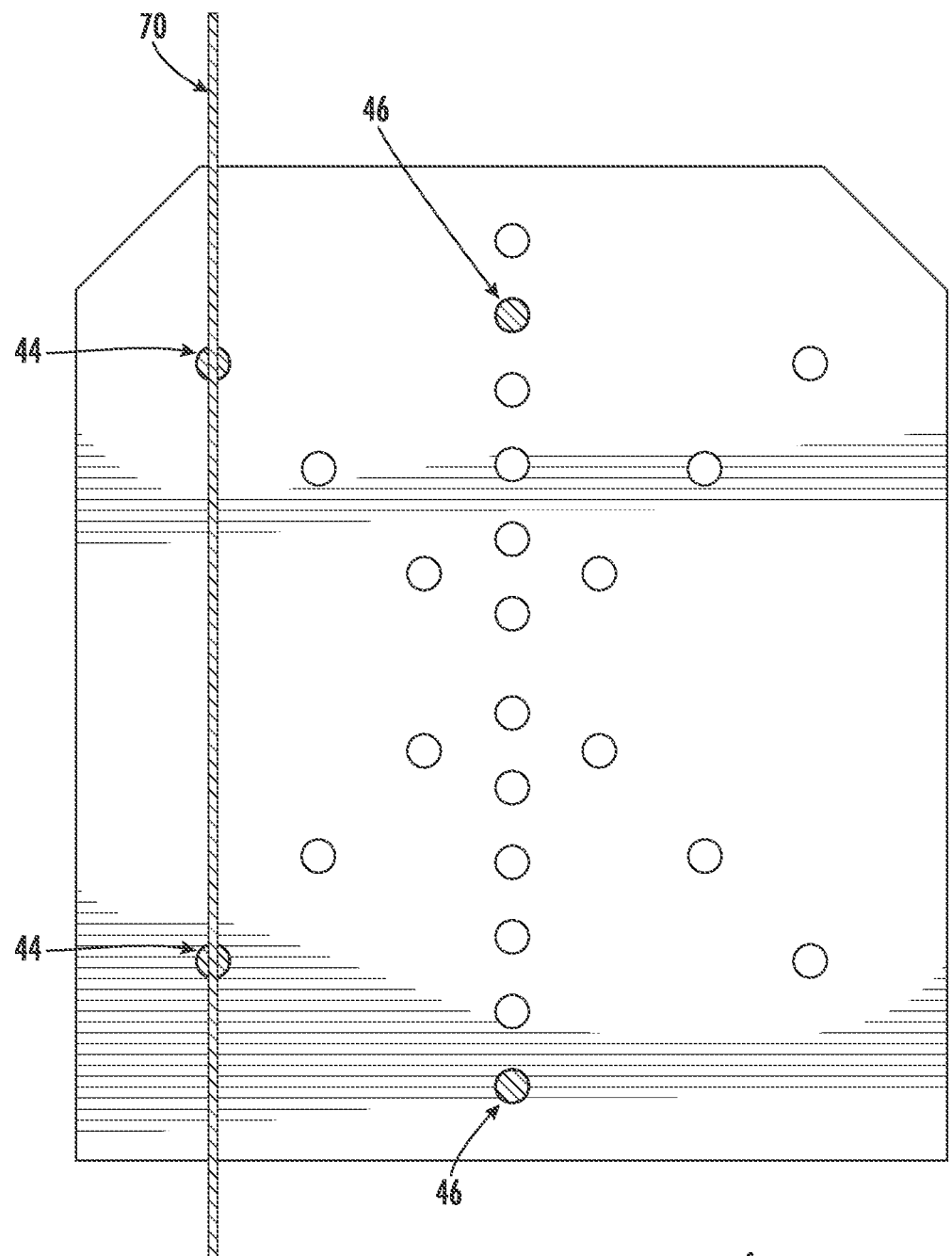
FIG. 6 is a front view of a laser target with an emitted laser projecting at a second position, according to an exemplary embodiment.

Turning to FIG. 6, emitted laser 70 is aligned with light-receiving apertures 44. Light-receiving apertures 44 are in optical communication with light-emitting apertures 46, such as by optical fiber 26 behind front surface 16. Light received by light-receiving apertures 44 is redirected to light-emitting apertures 46. Because of the distance light-emitting apertures 46 are from vertical center 48 of apertures 20, the user understands that emitted laser 70 is correspondingly further away from target line 24. To put this another way, the closer emitted laser 70 is to target line 24, the closer light-emitting apertures 46 are to vertical center 48.

Figure 7:
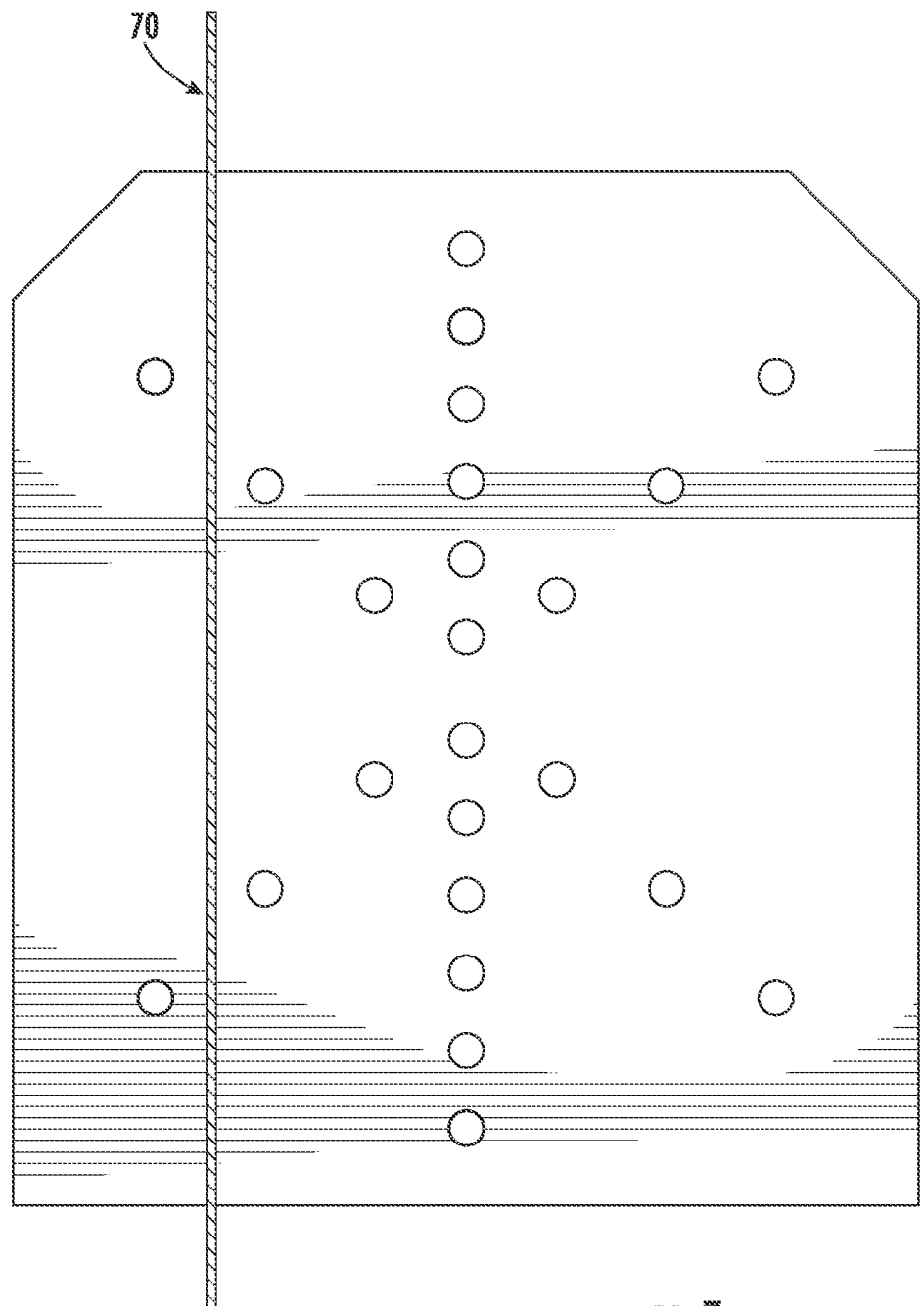
FIG. 7 is a front view of a laser target with an emitted laser projecting at a third position, according to an exemplary embodiment.
Figure 8:
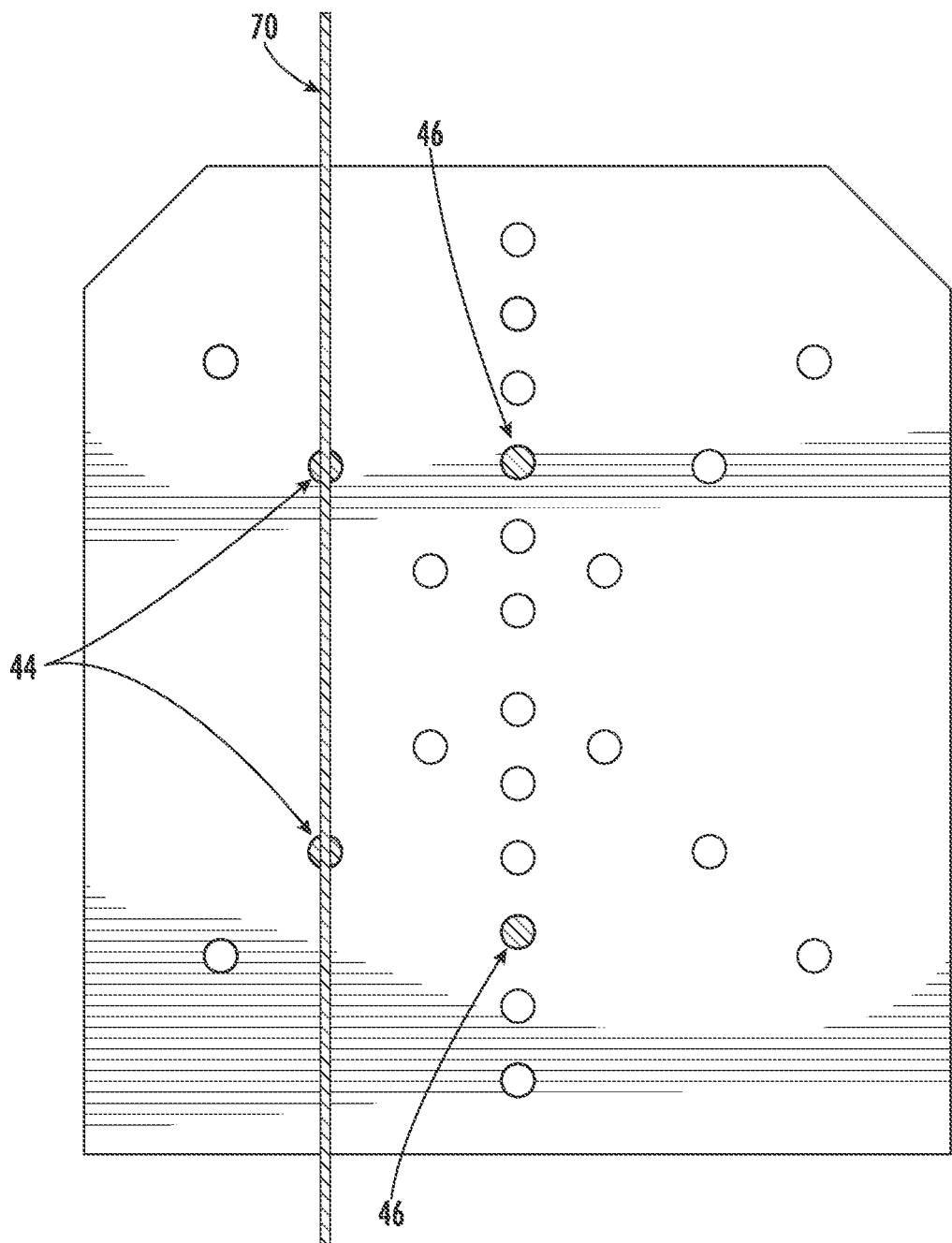
FIG. 8 is a front view of a laser target with an emitted laser projecting at a fourth position, according to an exemplary embodiment.

Turning to FIG. 7, emitted laser 70 is moved to the right and is no longer aligned with any apertures 20. Turning to FIG. 8, emitted laser 70 is adjusted and aligned with light-receiving apertures 44 that are in optical communication with light-emitting apertures 46. The fact that light-emitting apertures 46 are closer to a horizontal line on front surface 15, shown as vertical center 48, than light-emitting apertures 46 in FIG. 6 indicates that emitted laser 70 is relatively closer to target line 24 than in FIG. 6.

Figure 9:
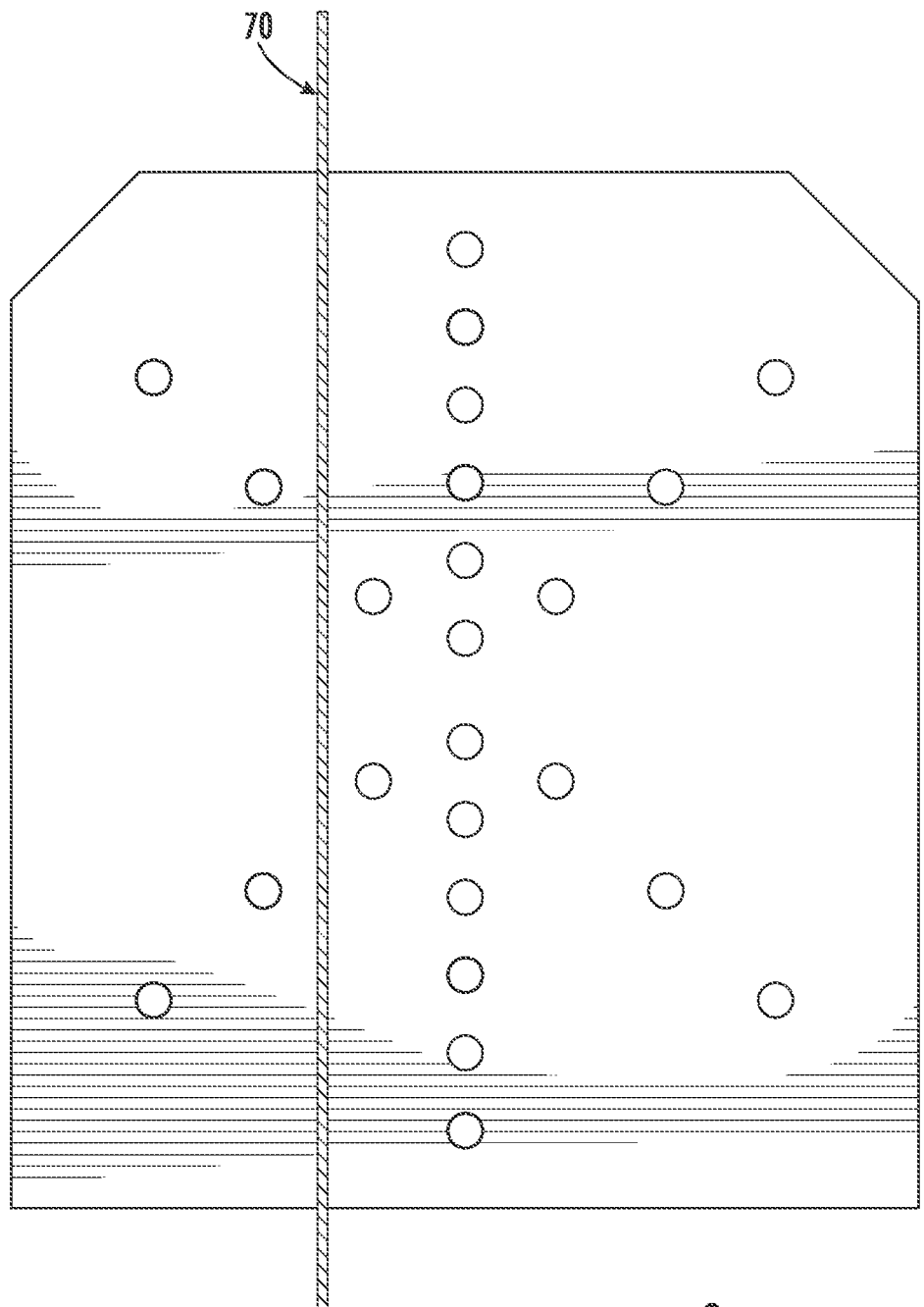
FIG. 9 is a front view of a laser target with an emitted laser projecting at a fifth position, according to an exemplary embodiment.
Figure 10:
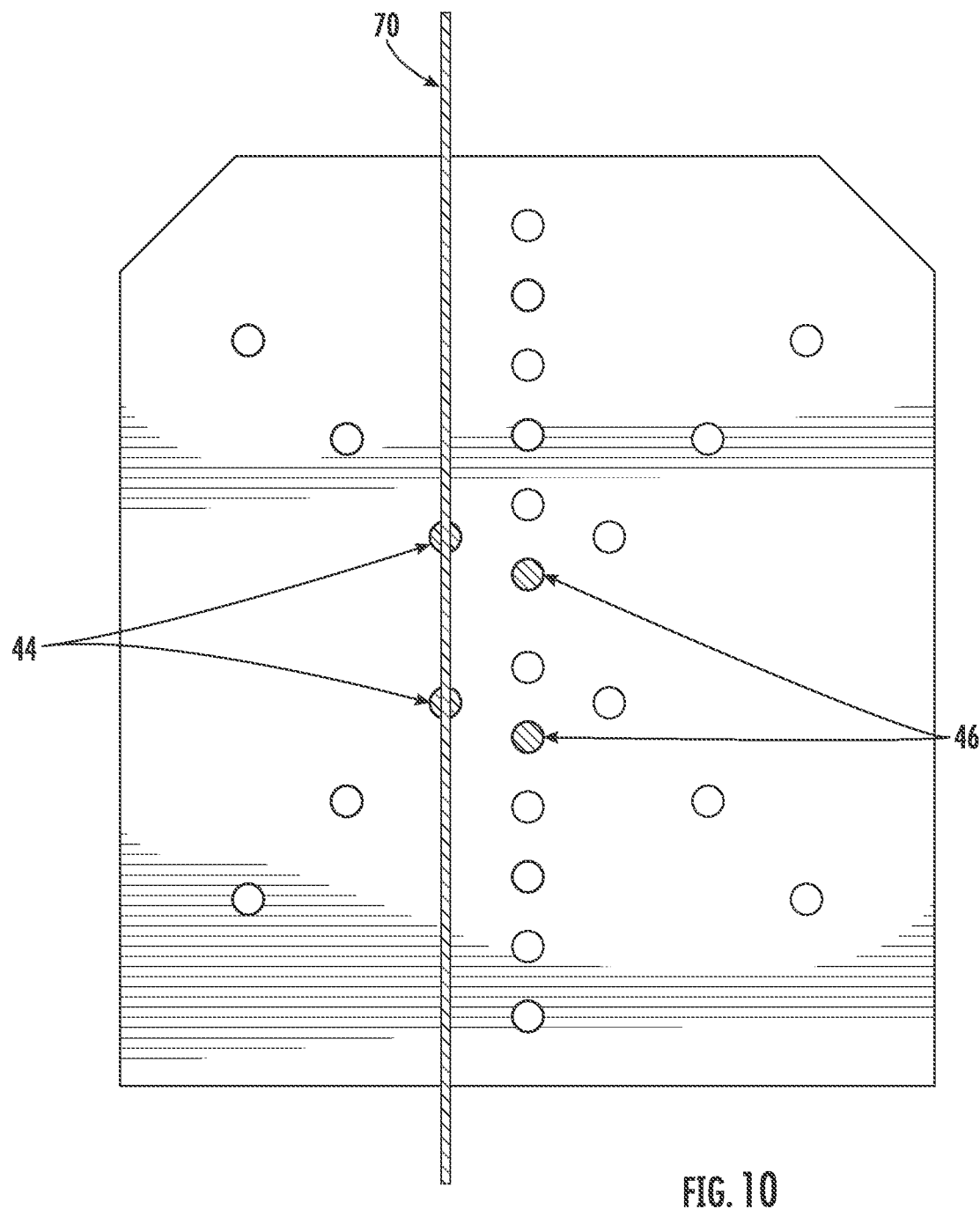
FIG. 10 is a front view of a laser target with an emitted laser projecting at a sixth position, according to an exemplary embodiment.

Turning to FIG. 9, emitted laser 70 is moved to the right and is no longer aligned with any apertures 20. Turning to FIG. 10, emitted laser 70 is adjusted and aligned with light-receiving apertures 44 that are in optical communication with light-emitting apertures 46. The fact that light-emitting apertures 46 are closer to vertical center 48 than light-emitting apertures 46 in either FIG. 6 or 8 indicates that emitted laser 70 is relatively closer to target line 24 than in either FIG. 6 or 8.

Figure 11:
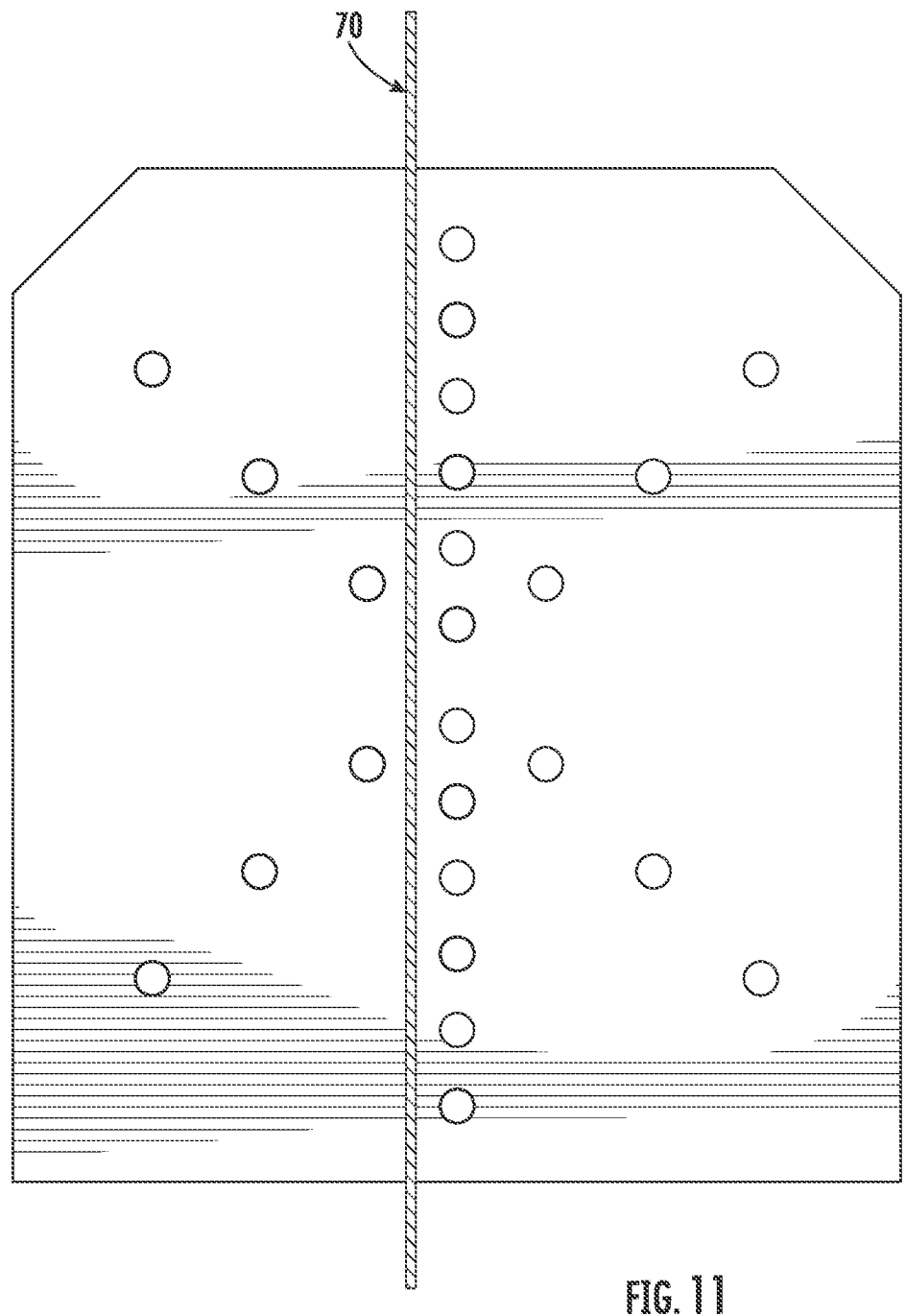
FIG. 11 is a front view of a laser target with an emitted laser projecting at a seventh position, according to an exemplary embodiment.
Figure 12:
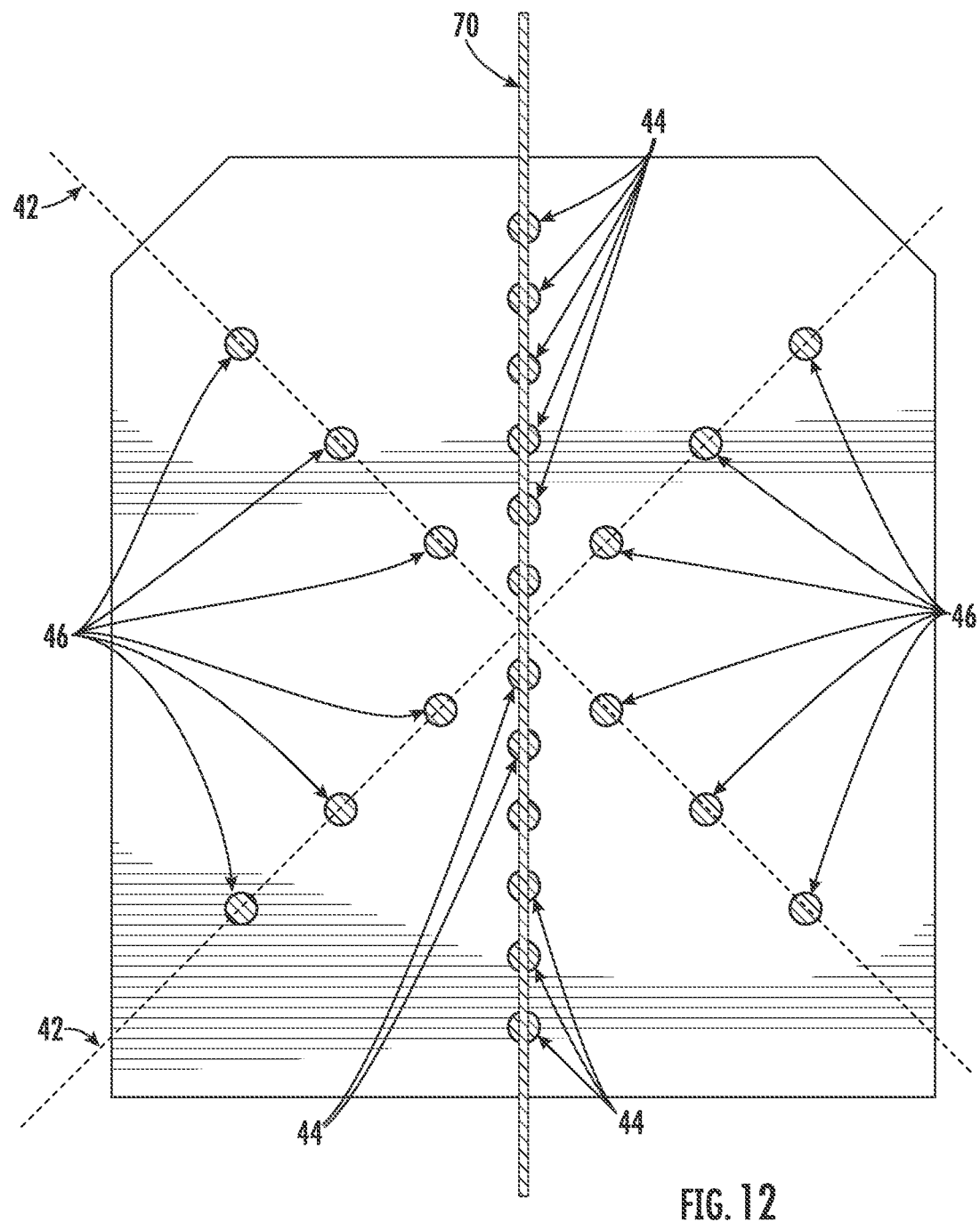
FIG. 12 is a front view of a laser target with an emitted laser projecting at an eighth position, according to an exemplary embodiment.

Turning to FIG. 11, emitted laser 70 is moved to the right and is no longer aligned with any apertures 20. Turning to FIG. 12, emitted laser 70 is adjusted and aligned with light-receiving apertures 44 that are in optical communication with light-emitting apertures 46. Because emitted laser 70 is aligned with apertures 20 that are aligned with target line 24, alignment indicator 42, shown as an X shape, is illuminated providing a clear indication that emitted laser 70 is aligned with target line 24. As a result of a vertical line of light being emitted at target line 24, light received by the target aperture 34 of a pair 22 of apertures 20 is redirected and emitted by the corresponding offset aperture 36 of the respective pair 22 of apertures 20.

Figure 13:
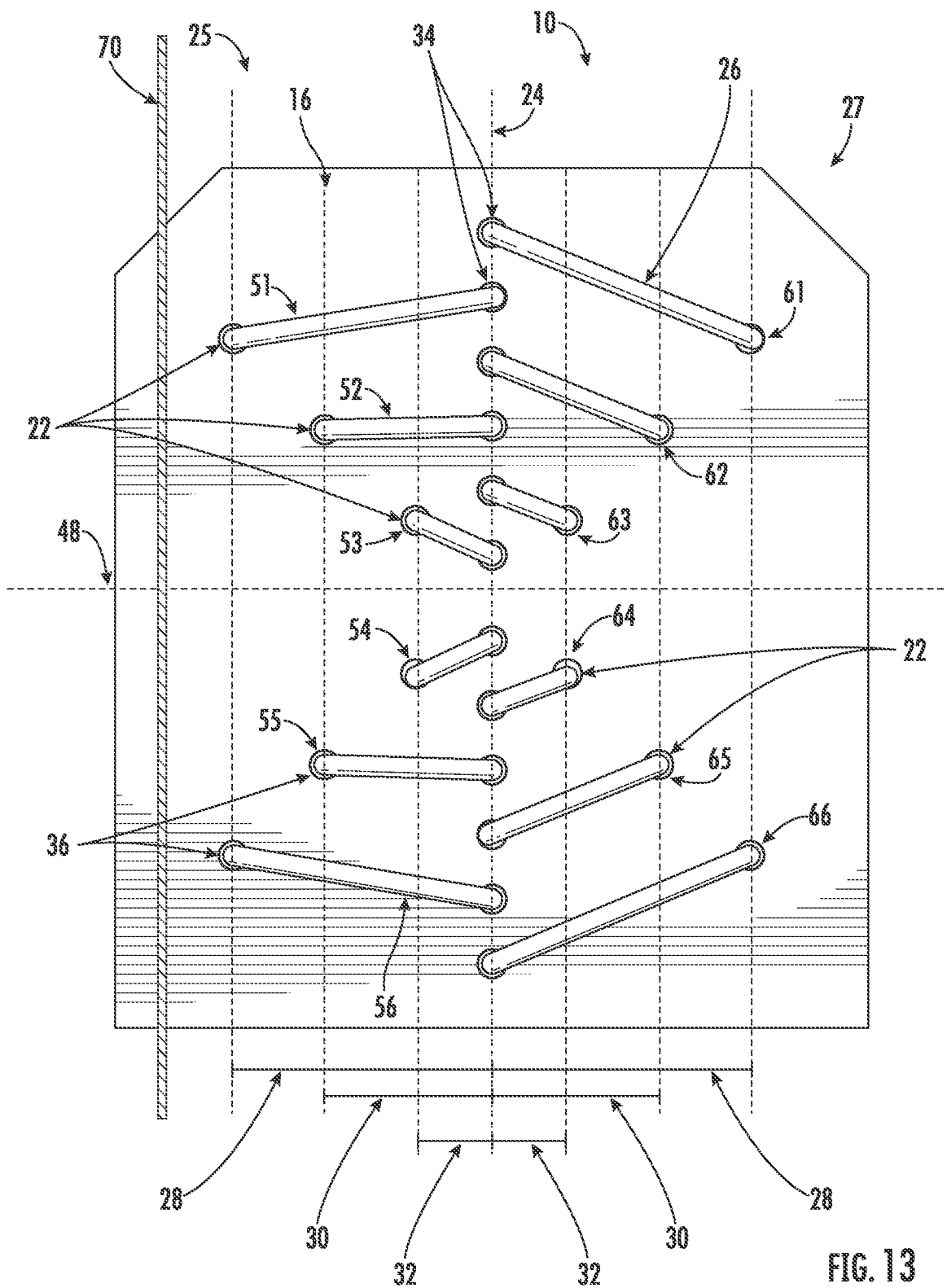
FIG. 13 is a front view of a laser target with an emitted laser projecting at a first position, according to an exemplary embodiment.

In another embodiment, FIG. 13, optic fibers 26 optically connect offset apertures 36 with aligned apertures 34 so that light emitted from the aligned apertures 34 is symmetric with respect to vertical center 48. For example, in the embodiment in FIG. 13, as emitted laser 70 is moved to the right, the first two offset apertures 36 laser 70 aligns with are in optical communication with the aligned apertures 34 that are both second furthest from vertical center 48. As emitted laser 70 continues moving towards aligned apertures 34, emitted laser 70 next aligns with the second pair of offset apertures 36, which are in optical communication with aligned apertures 34 that are the same distance from vertical center 48. Similarly, on the right side of target 10 offset apertures 36 that are vertically aligned with each other are in optical communication with aligned apertures 34 that are symmetric with respect to vertical center 48.

The positioning of pairs 51, 52, 53, 54, 55, 56, 61, 62, 63, 64, 65, and 66 will now be described for a specific embodiment. Pairs 51, 52, 53, 54, 55, and 56 are on first side 25 of target line 24, and pairs 61, 62, 63, 64, 65, and 66 are on second side 27 of target line opposite first side 25.

A first pair 51 of apertures 20 includes a target aperture 34 and an offset aperture 36, with the offset aperture 36 being horizontal distance 28 from target line 24, a second pair 52 of apertures 20 includes a target aperture 34 and an offset aperture 36, with the offset aperture 36 being horizontal distance 30 from target line, and a third pair 53 of apertures 20 includes a target aperture 34 and an offset aperture 36, with the offset aperture 36 being horizontal distance 32 from target line. Pair 61 of apertures 20 includes a target aperture 34 and an offset aperture 36, with the offset aperture 36 being distance 28 from target line 24, and pair 61 of apertures 20 includes a target aperture 34 and an offset aperture 36, with the offset aperture 36 being distance 30 from target line, and pair 63 of apertures 20 includes a target aperture 34 and an offset aperture 36, with the offset aperture 36 being distance 32 from target line. In a specific embodiment offset aperture 36 of pair 51 is vertically above offset aperture 36 of pair 56, offset aperture 36 of pair 52 is vertically above offset aperture 36 of pair 55, and offset aperture 36 of pair 53 is vertically above offset aperture 36 of pair 54.

In a specific embodiment, pair 54 of apertures 20, pair 55 of apertures 20, and pair 56 of apertures 20 are symmetrical to pair 53, pair 52, and pair 51, respectively, with respect to vertical center 48. In a specific embodiment pair 61, pair 62, and pair 63 are symmetrical to pair 51, pair 52, and pair 53, respectively, with respect to target line 24. In a specific embodiment pair 61, pair 62, and pair 63 are symmetrical to pair 64, pair 65, and pair 66, respectively, with respect to vertical center 48.

The example(s) herein describe emitted laser 70 being adjusted from left-to-right towards target line 24. However, it is considered herein that emitted laser 70 could be adjusted from right-to-left towards target line 24 with similar effect.

Alignment indicator 42 is shown as an X-shape including two angled lines intersecting at target line 24. However, it is considered herein that alignment indicator 42 could include any arrangement of apertures 20 and still practice the disclosure described herein.

In one or more embodiments, an aperture 20 within target zone 38 includes a light detector that emits a signal. In response to the signal, an aperture within indicator zone 40 emits a signal, such as light and/or sound.

In one or more embodiments an aperture 20 within target zone 38 is optically connected via optical fibers 26 to at least two apertures 20 within indicator zone 40 such that light received by a given target aperture 34 is routed by a first optical fiber 26 to a first indicator aperture 36 and the light is also routed by a second optical fiber 26 to a second indicator aperture 36. For example, an aperture 20 may be a slit (e.g., a vertical slit) aligned with target line 24, the vertical slit including a plurality of optical fiber 26 that transmit light to the at least two apertures 20 within indicator zone 40.

Figure 14:
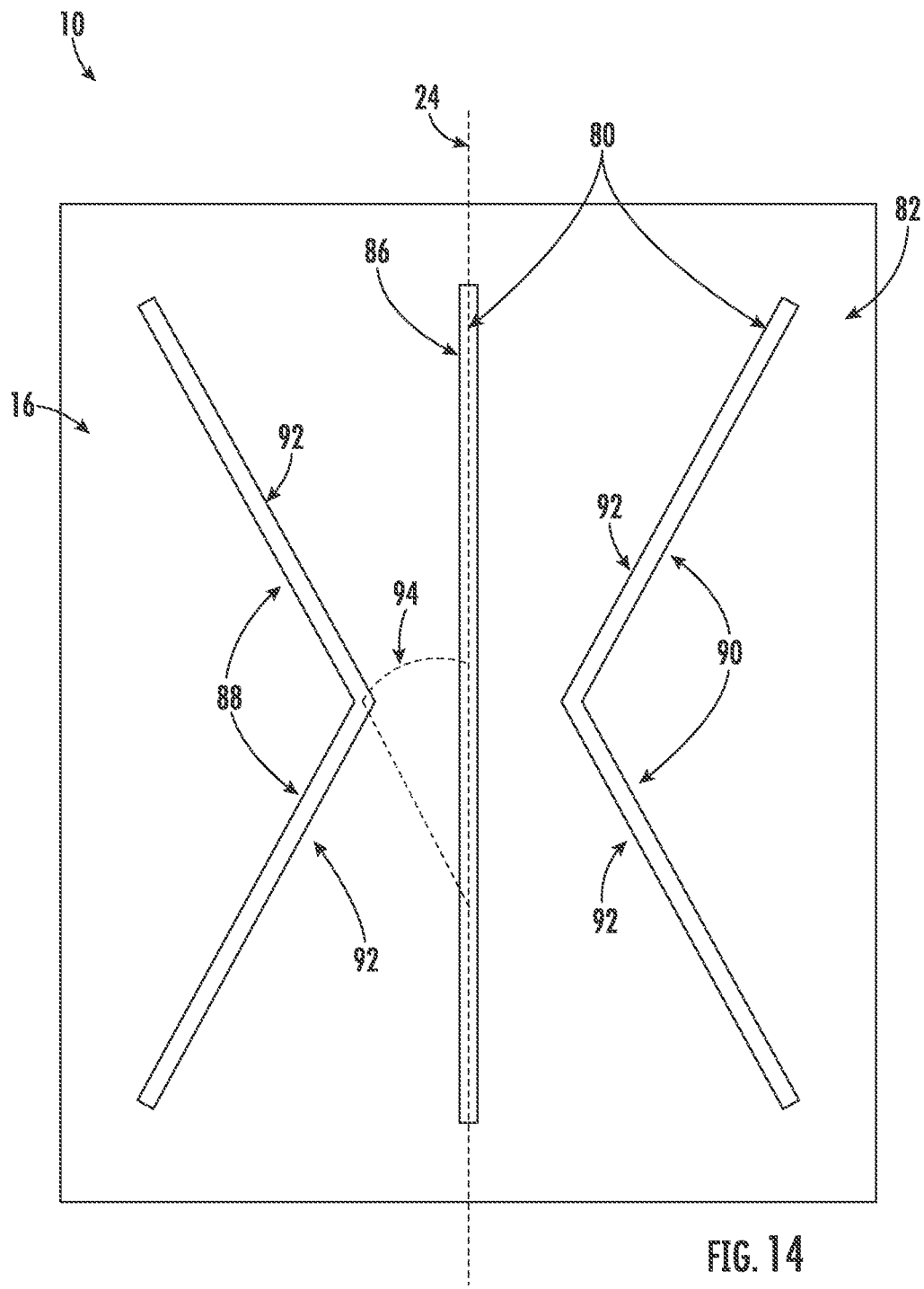
FIG. 14 is a front view of a laser target, according to an exemplary embodiment.
Figure 15:
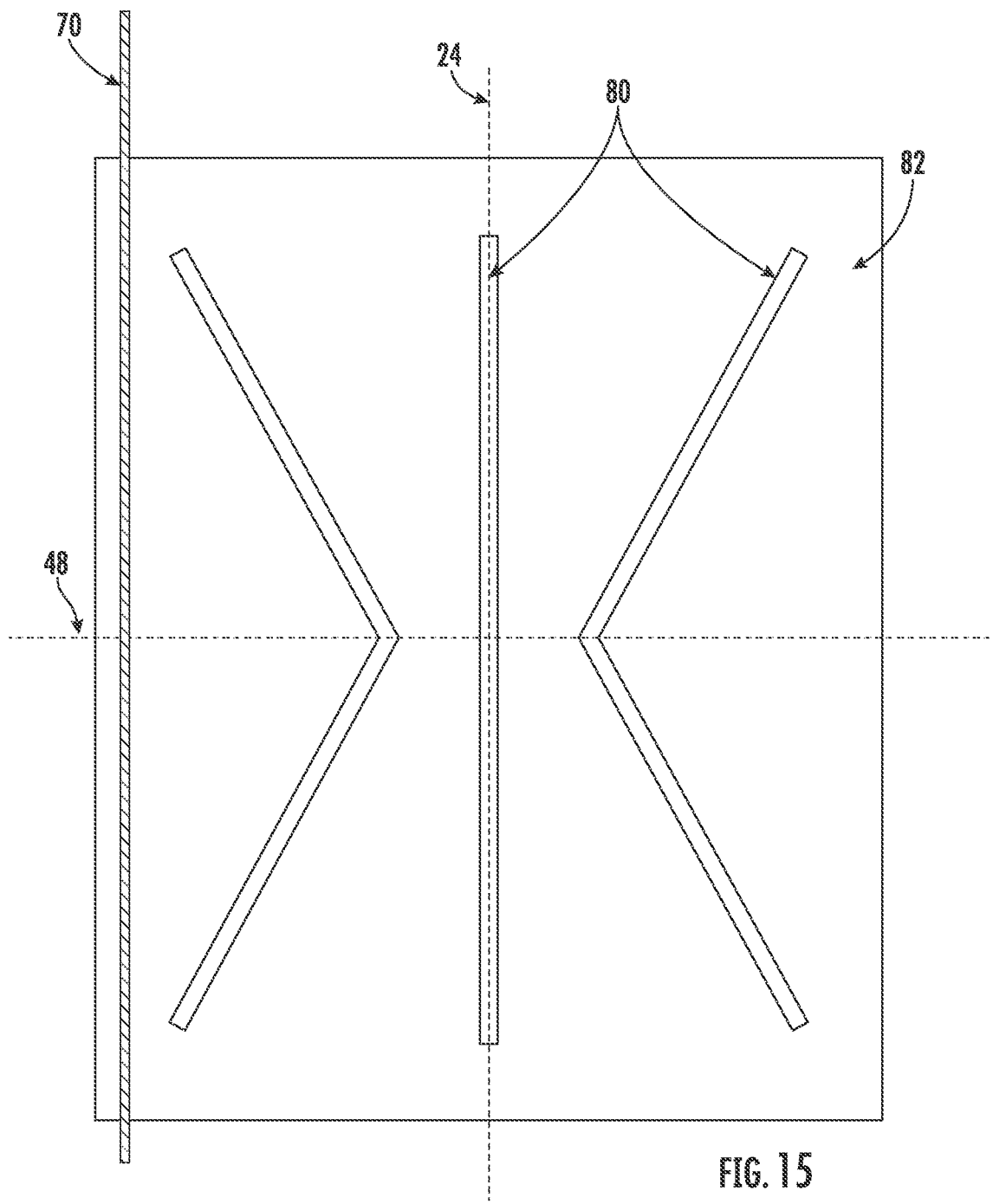
FIG. 15 is a front view of a laser target with an emitted laser projecting at a ninth position, according to an exemplary embodiment.

Referring to FIG. 14, a laser target, shown as target 10, defines front surface 16. Front surface 16 includes high-reflective portions 80, shown as reflective tape, and low-reflective portions 82, shown as non-reflective background. In a specific embodiment the high-reflective portions 80 have a reflectivity that is at least 50% more reflective than low-reflective portions 82.

High-reflective portions 80 include target portion 86, which is aligned with target line 24 (e.g., a vertical target line 24), and first indicator portion 88 and second indicator portion 90. First indicator portion 88 is on a first side 25 of target line 24, and second indicator portion 90 is on a second side 27 of target line 24. First indicator portion 88 and second indicator portion 90 each include one or more segments 92 that extend diagonally away from target portion 86. In a specific embodiment the one or more segments 92 extend away from target line 24 at an angle 94 between 10 degrees and 80 degrees, and more specifically between 20 degrees and 70 degrees, and even more specifically between 35 degrees and 55 degrees.

In a specific embodiment each segment 92 of the plurality of segments 92 is symmetrical to a corresponding segment 92 of the plurality of segments 92 with respect to the vertical target line 24. In a specific embodiment the left-indicator portion 88 includes two segments 92 that extend away from the target line 24 at an angle 94 between 10 degrees and 80 degrees, and the right-indicator portion 90 includes two segments 92 that extend away from the target line at an angle 94 between 10 degrees and 80 degrees.

FIGS. 15-18 depict a series of images showing an emitted laser, shown as emitted laser 70, being aimed closer and closer to target line 24 until emitted laser 70 is aligned or nearly aligned with target line 24. Starting at FIG. 15, emitted laser 70 is not aligned with any of high-reflective portions 80. To correct this, a user adjusts emitted laser 70 to aim further to the right. For purposes of this description it will be stated that the aim of emitted laser 70 is adjusted by a user, although it is to be understood that target 10 instead may be moved, or both the sighting laser and target 10 may be adjusted for any given adjustment.

Figure 16:
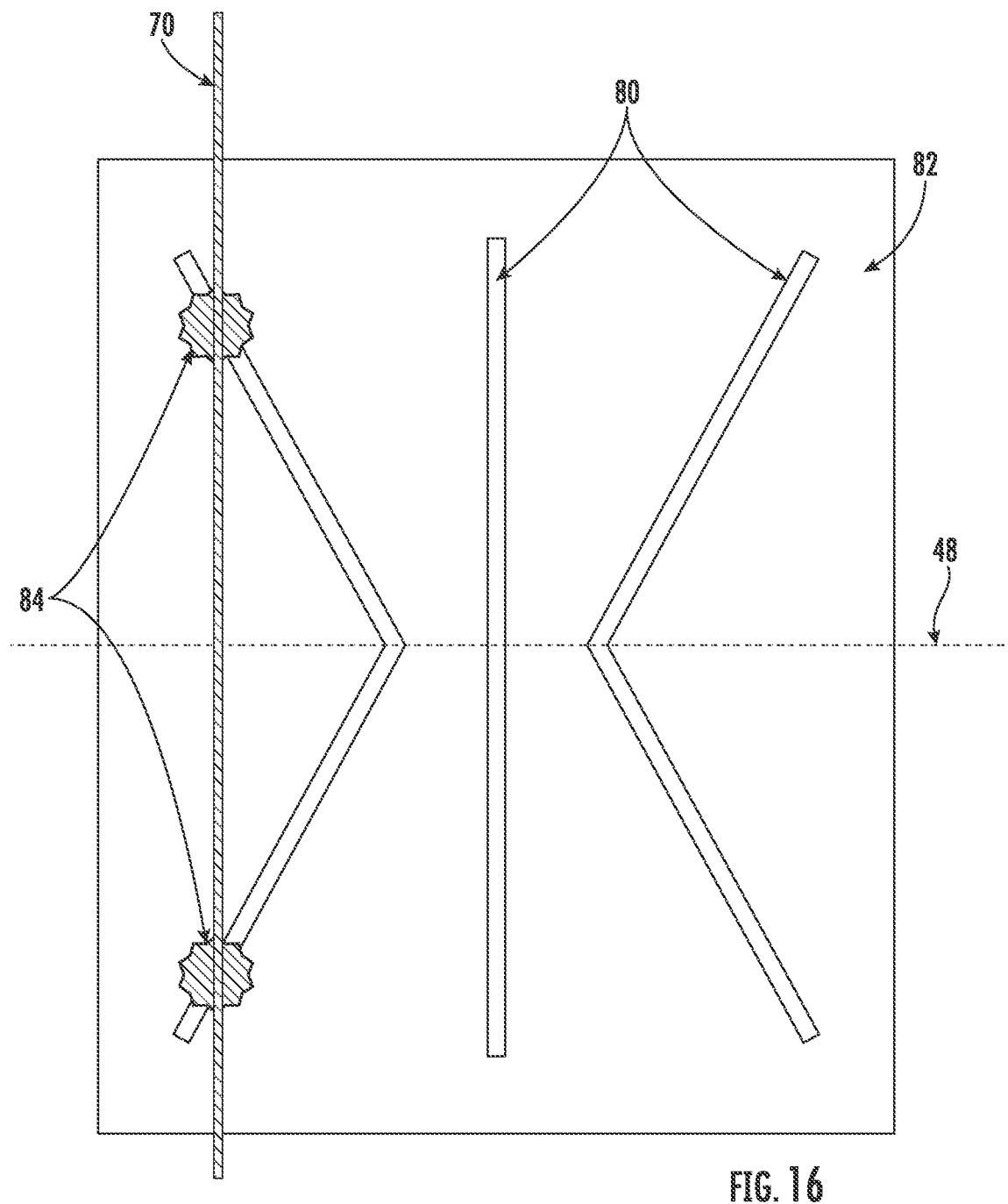
FIG. 16 is a front view of a laser target with an emitted laser projecting at a tenth position, according to an exemplary embodiment.

Turning to FIG. 16, emitted laser 70 is aligned with high-reflective portion 80 so that light reflections 84 are reflected from high-reflective portion 80. Because of the horizontal distance that light reflections 84 are from target line 24, and because of the vertical distance that light reflections 84 are from vertical center 48 of surface 16, the user understands that emitted laser 70 is a corresponding distance away from target line 24.

Figure 17:
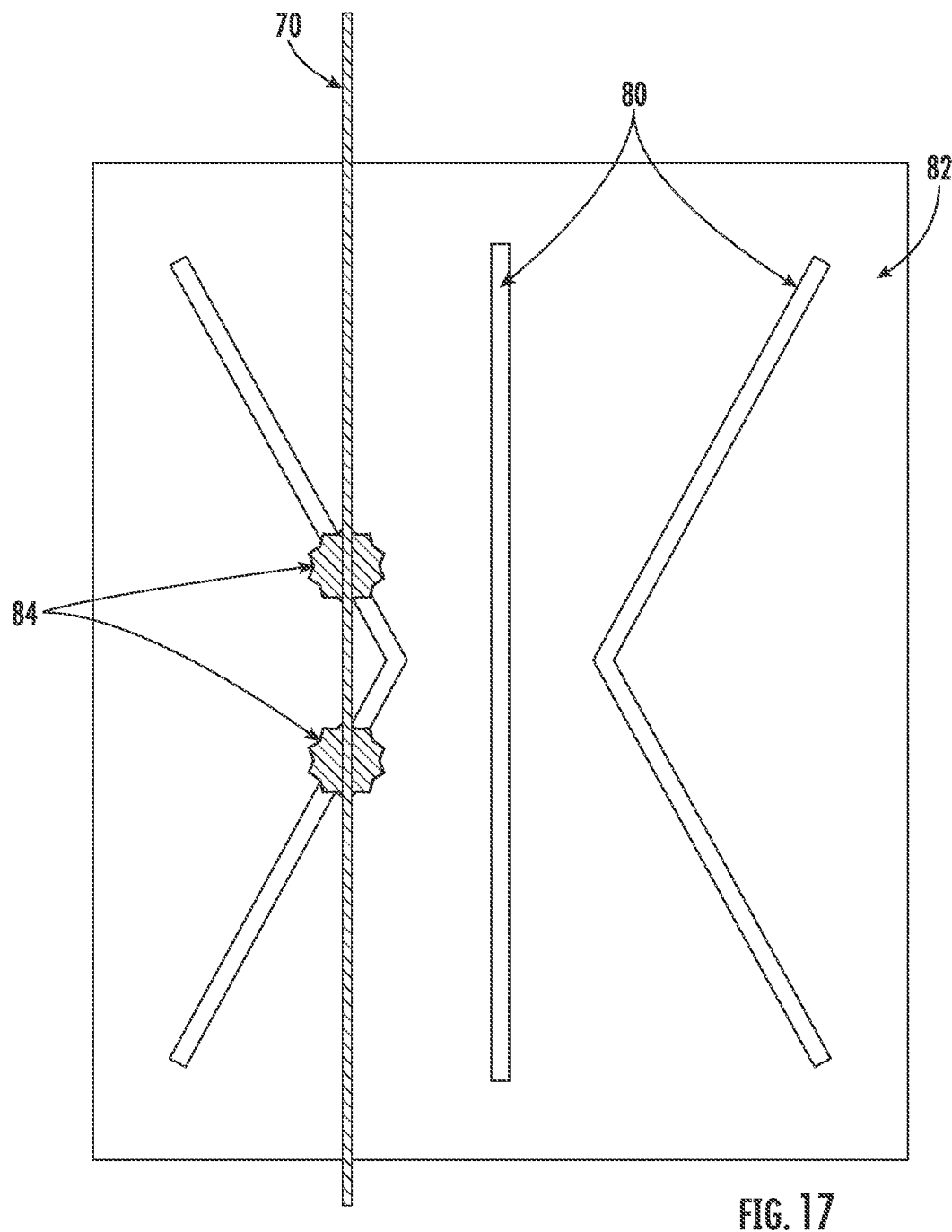
FIG. 17 is a front view of a laser target with an emitted laser projecting at an eleventh position, according to an exemplary embodiment.

Turning to FIG. 17, emitted laser 70 is moved to the right and light reflections 84 are now closer to both target line 24 and vertical center 48. The fact that light reflections 84 are closer to vertical center 48 than light reflections 84 in FIG. 16 indicates that emitted laser 70 in FIG. 17 is closer to target line 24 than emitted laser 70 in FIG. 16.

Figure 18:
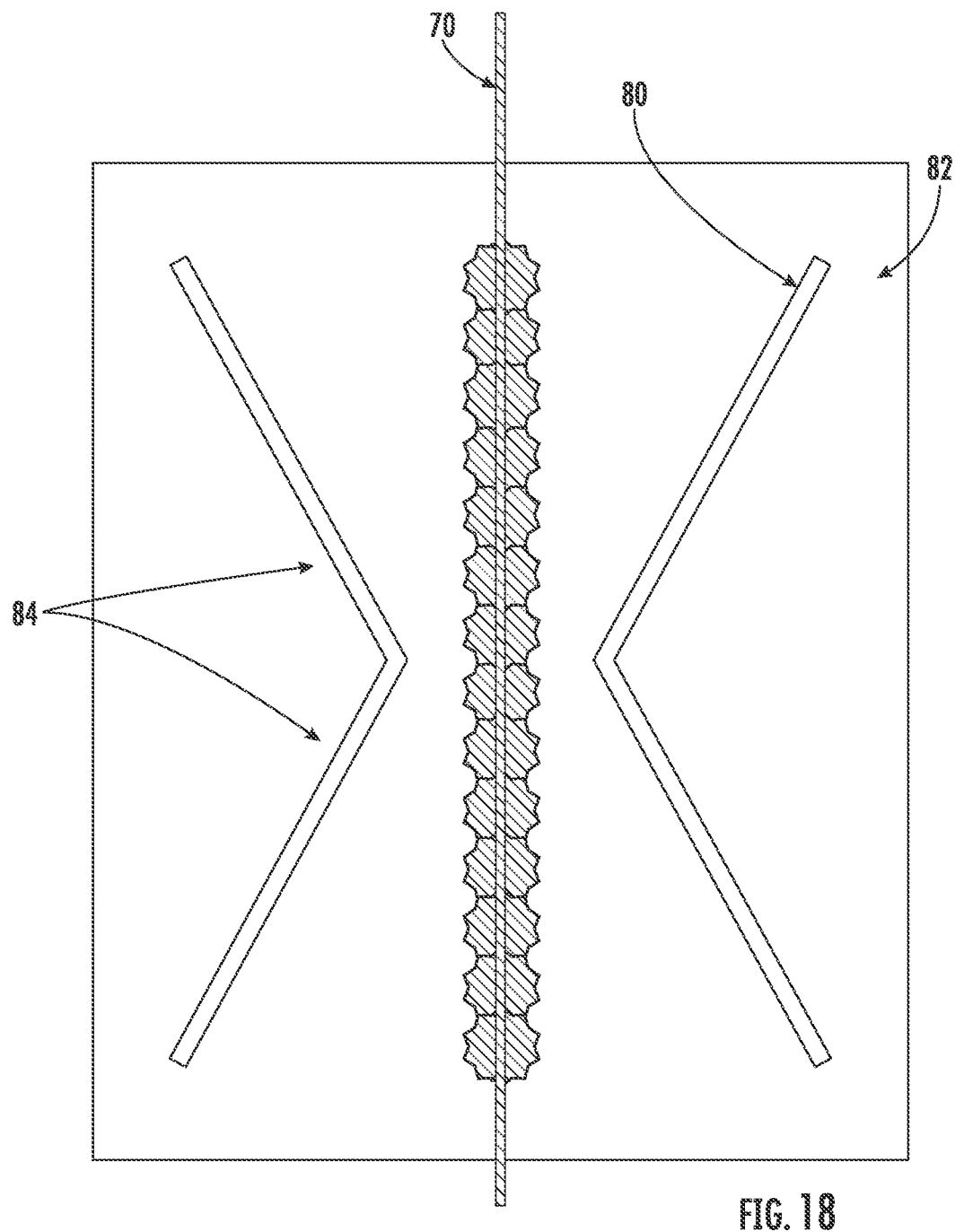
FIG. 18 is a front view of a laser target with an emitted laser projecting at a twelfth position, according to an exemplary embodiment.

Turning to FIG. 18, emitted laser 70 is adjusted and aligned with target line 24. As a result, a plurality of light reflections 84 are reflected from surface 16. Although FIG. 18 indicates that there are a discrete plurality of light reflections 84, it is contemplated herein that light reflections 84 may define a continuous light reflection that extends along reflective portion 80 aligned with target line 24.

In one embodiment reflective portions 80 have a width between 1/8" (one-eighth of an inch) and 1/2" (one-half of an inch), and more specifically have a width of 1/4" (one-quarter of an inch). It is contemplated herein that reflective portions 80 may have non-uniform widths such that a first part of reflective portion 80 has a first width and a second part of reflective portions 80 has a second width.

Reflective portions 80 are shown as three distinct portions defining a greater than sign (">"), an vertical line ("1") and a less than sign ("<"). However, it is contemplated herein that reflective portions could include any disposition on surface 16 and still practice the disclosure described herein.

It should be understood that the figures illustrate exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A laser target comprising:
 a housing;
 a front surface defined by the housing;
 a first reflective portion of the front surface;
 a second reflective portion of the front surface, wherein the second reflective portion has a reflectivity that is greater than the first reflective portion, wherein the second reflective portion comprises a target portion and an indicator portion, and wherein the indicator portion extends away from the target portion,
 wherein the second portion is configured to indicate alignment with a line of light received on the front surface by reflecting more light when the target portion coincides with the line of light than when the indicator portion coincides with the line of light.

2. The laser target of claim 1, wherein the indicator portion of the second reflective portion comprises a left-indicator portion on a first side of the target portion, and a right-indicator portion on a second side of the target portion opposite the first side.

3. The laser target of claim 2, wherein the target portion of the second reflective portion comprises a vertical line.

4. The laser target of claim 1, wherein the indicator portion of the second reflective portion comprises a left-indicator portion on a first side of the target portion, and a right-indicator portion on a second side of the target portion opposite the first side, and wherein the target portion of the second reflective portion defines a vertical line, and wherein the second reflective portion comprises a plurality of segments that collectively define the left-indicator portion and the right-indicator portion, and wherein the plurality of segments extend away from the vertical line at an angle between 10 degrees and 80 degrees.

5. The laser target of claim 4, wherein each segment of the plurality of segments is symmetrical to a corresponding segment of the plurality of segments with respect to the vertical line.

6. The laser target of claim 4, wherein the target portion of the second reflective portion defines a vertical line, wherein the left-indicator portion comprises two segments that extend away from the vertical line at an angle between 10 degrees and 80 degrees, and wherein the right-indicator portion comprises two segments that extend away from the vertical line at an angle between 10 degrees and 80 degrees.

* * * * *